United States Patent [19]

Harrold

[11] 4,095,208
[45] June 13, 1978

[54] INTERMITTENTLY OPERABLE ELECTRICAL SWITCH ASSEMBLY

[75] Inventor: Maurice Harrold, Rowley Regis, England

[73] Assignee: Lucas Industries Limited, Birmingham, England

[21] Appl. No.: 733,979

[22] Filed: Oct. 20, 1976

[30] Foreign Application Priority Data

Nov. 8, 1975 United Kingdom ............... 46304/75

[51] Int. Cl.² ............................................. H01H 61/06
[52] U.S. Cl. ....................................... 337/125; 337/141
[58] Field of Search ............... 337/92, 102, 89, 134, 337/131, 135, 136, 139, 140, 141, 125; 335/35

[56] References Cited

U.S. PATENT DOCUMENTS

| 3,011,037 | 11/1961 | Welsh | 337/92 X |
| 3,441,890 | 4/1969 | Prickett | 337/92 X |

FOREIGN PATENT DOCUMENTS

| 1,162,448 | 2/1964 | Germany | 337/139 |
| 1,068,143 | 5/1967 | United Kingdom | 337/139 |
| 1,113,870 | 5/1968 | United Kingdom | 337/139 |

Primary Examiner—George Harris
Attorney, Agent, or Firm—J. Rodman Steele, Jr.

[57] ABSTRACT

An intermittently operable switch assembly comprises an electrically insulating base having mounted on one surface thereof a first electrical terminal for connection to a power supply, a second electrical terminal for connection to an apparatus to be operated intermittently, and a third electrical terminal for connection to an indicator lamp. On the opposite surface of the base are mounted a first support carrying an armature at one end thereof which is engageable with a first fixed contact and having an electrical winding thereon, a second support including a mounting flange and having a snap action circuit breaker mounted thereon, and a third support having a second fixed contact thereon with which the circuit breaker is arranged to engage. The first, second and third terminals are secured to the base respectively by means of three rivets with which they are respectively electrically connected. The rivets also serve to mount the first, second and third supports on the base, and to provide electrical connections between the terminals and the supports. The electrical winding on the first support is disposed with its axis parallel to the base and to the armature; the snap-action circuit breaker is oriented parallel to the base; and the mounting flange of the second support extends transversely with respect to the axis of the winding.

12 Claims, 6 Drawing Figures

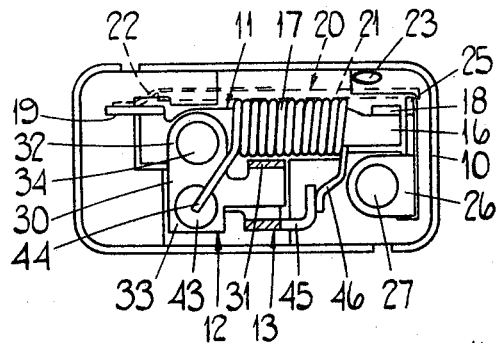
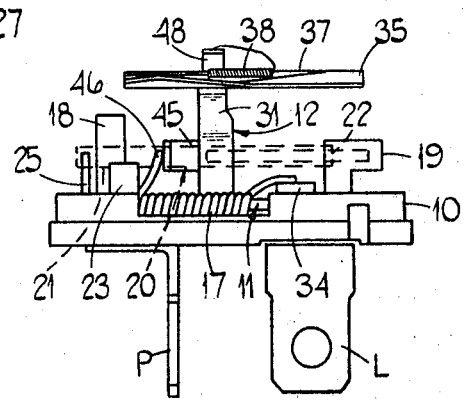
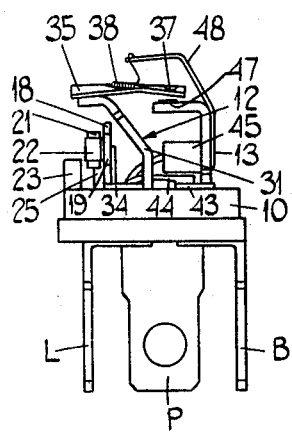
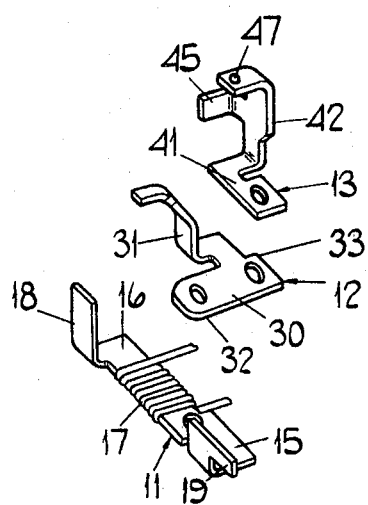

INTERMITTENTLY OPERABLE ELECTRICAL SWITCH ASSEMBLY

This invention relates to an intermittently-operable electrical switch assembly particularly, though not exclusively, for use in a vehicle direction indicator lamp circuit.

According to the present invention, there is provided an intermittently-operable electrical switch assembly comprising an electrically insulating base having a pair of opposed surfaces; first, second and third electrical terminals mounted on said base in spaced relation and extending from one of said opposed surfaces thereof, said first, second and third electrical terminals being for respective connection to an electrical power supply, an electrical apparatus to be operated intermittently by said switch assembly, and an indicator lamp or indicator lamps; an electrically conducting fixing element securing each of said first, second and third electrical terminals to said base, each said fixing element being electrically connected with its respective electrical terminal and extending through said base to the other of said opposed surfaces thereof; a first support mounted on the said other surface to said base, said first support terminating at one end adjacent the fixing element for said second electrical terminal and at its other end adjacent the fixing element for said third electrical terminal; an electrical winding on said first support, said first support providing a core therefor, said electrical winding being disposed with its axis substantially parallel to said base; an armature mounted on said first support at the said one end thereof and extending substantially parallel to said electrical winding axis; a first fixed electrical contact mounted on the said other surface of said base adjacent the said other end of the first support, said first fixed electrical contact being electrically connected to the fixing element for the third electrical terminal and being engageable by said armature, said armature normally being biassed away from said first fixed electrical contact but being engaged with said first fixed electrical contact when said electrical winding is energised in use; a second support mounted on the said other surface of said base and including a portion upstanding from said base and a mounting flange integral therewith, said mounting flange extending in a direction transversely of said electrical winding axis and terminating at one end adjacent the fixing element for the second electrical terminal and at its other end adjacent the fixing element for the first electrical terminal, said second support being secured to said base by means of said mounting flange; a snap-action circuit breaker mounted on said upstanding portion of said second support; a second fixed electrical contact carried by the said other surface of said base and engageable with said circuit breaker; and a heat-expansible element normally biassing said circuit breaker into a first position and being arranged, when heated by an electric current passing therethrough in use, to release said circuit breaker to move into a second position, said circuit breaker engaging said second fixed electrical contact in one of its said first and second positions.

Preferably, the fixing element for the second electrical terminal also serves to secure the said one end of the first support to the base. In this case, the first support is conveniently electrically connected to the fixing element for the second electrical terminal, and said armature is electrically connected to the first support.

Desirably, the respective fixing elements for the first and second electrical terminals also serve to secure the mounting flange of the second support to the base. Advantageously, the second support is electrically conductive and is electrically connected to said circuit-breaker, the mounting flange of said second support being electrically connected to one of the respective fixing elements for the first and second electrical terminals and being electrically isolated from the other. Preferably, the second support is electrically connected to the fixing element for the second electrical terminal and is electrically isolated from the fixing element for the first electrical terminal.

Most advantageously, a third support is mounted on the said other surface of the base and includes a portion upstanding from said base and a mounting portion integral therewith, said second fixed electrical contact being carried by said upstanding portion, said mounting portion being mounted on said base adjacent the fixing element for the first electrical terminal. Preferably, the fixing element for the first electrical terminal also serves to secure the mounting portion of said third support to the base. The third support may be electrically conductive and electrically connected to said second fixed electrical contact, and the mounting portion of the third support may be electrically isolated from the fixing element for the first electrical terminal.

The first fixed electrical contact may form part of an electrically conductive contact element which is secured to said base by the fixing element for the third electrical terminal and which is electrically connected with that fixing element.

The snap-action circuit breaker preferably comprises a vane which is disposed substantially parallel to the plane of said base. The heat-expansible element preferably comprises a metallic ribbon and a heating coil mounted on said ribbon, said ribbon having its ends connected to said vane and having a constriction therein at which said heating coil is mounted.

An embodiment of the present invention will now be described, by way of example, with reference to the accompanying drawings, in which:

FIG. 1 is a schematic plan view of an intermittently-operable electrical switch assembly according to the present invention, with parts thereof broken away;

FIG. 2 is a schematic front elevation of the switch assembly of FIG. 1

FIG. 3 is an end elevation of the switch assembly of FIGS. 1 and 2;

FIG. 4 is a perspective view of parts of the switch assembly of FIGS. 1 to 3;

Figure 5:
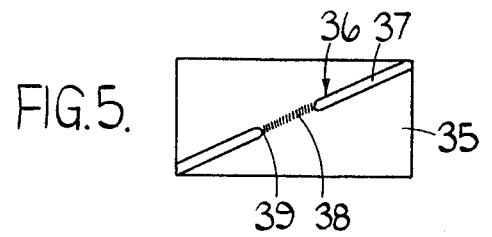
FIG. 5 is a plan view of further parts of the switch assembly of FIGS. 1 to 3.

Referring first to FIGS. 1 to 3, the intermittently-operable electrical switch assembly comprises an electrically insulating base 10 having first, second and third electrical terminals B, L and P respectively mounted thereon in spaced relation and extending from a lower surface thereof. The terminals B, L and P are secured to the base 10 by means of respective rivets 43, 34 and 27 which each extend through the base 10. The terminals B, L and P are electrically connected to the respective rivets 43, 34 and 27. On an upper surface of the base 10 are mounted three electrically conducting supports 11, 12 and 13. These supports are shown in detail in FIG. 4.

The first of these supports, 11, is recessed into the base 10 and extends longitudinally therealong. One end 15 of the support 11 is disposed adjacent the rivet 34, the other end 16 thereof being disposed adjacent the rivet 27. The support 11 carries an electrical winding 17 between its ends, and acts as a core therefor. The winding 17 is disposed such that its axis is parallel to the plane of base 10. An upstanding projection 18 extends integrally from the end 16 of support 11. A further upstanding projection 19, of L-shape, extends integrally from the end 15 of the support 11, and has mounted thereon an armature 20 (shown in broken line in FIGS. 1 and 2).

The armature 20 includes an arm portion 21, which extends substantially parallel to the axis of winding 17, and a spring portion 22 by which arm portion 21 is resiliently mounted on the projection 19. Both portions 21 and 22 are electrically conductive, and the armature 20 is electrically connected to the support 11. The arm portion 21 is normally biassed by spring portion 22 away from the first support 11 and into engagement with a post 23 which is integrally formed with the base 10, arm portion 21 being held in space relation to the projection 19. However, when the winding 17 is energised in use, the armature 20 is magnetically attracted by the projections 18 and 19 on the support 11, thereby engaging an end of arm portion 21 remote from spring portion 22 with a first fixed electrical contact 25 located adjacent the end 16 of the support 11.

The contact 25 is formed as an upstanding projection on an electrically conducting contact element 26, which contact element 26 is mounted on the upper surface of the base 10 and is secured thereto by means of the rivet 27. The contact element 26 is also electrically connected to the rivet 27.

The second of the supports, 12 includes a mounting flange 30 and an upstanding portion 31 integral therewith. The mounting flange 30 extends in a direction substantially perpendicular to the axis of winding 17, and terminates at one end 32 adjacent the rivet 34 and at its other end 33 adjacent the rivet 43. The rivets 34 and 43 serve to secure the mounting flange 30 to the base 10. The mounting flange 30 is electrically connected to the rivet 34, but is electrically isolated from the rivet 43. Moreover, the end 32 of mounting flange 30 is in electrical contact with the end 15 of the support 11.

Carried by the upstanding portion 31 of the support 12, and in electrical contact therewith, is a vane 35 of a snap-action circuit breaker. (The upstanding portion 31 is broken away in FIG. 1, and consequently the vane 35 is not shown therein). The vane 35 is disposed above the winding 17 and extends substantially parallel to the plane of base 10. A heat-expansible element 36 is mounted on the vane 35, and includes a metallic ribbon 37 extending diagonally across the vane 35 and secured thereto at its ends, and a high resistance heating coil 38 mounted on the ribbon 37 at a central constriction 39 thereof. The vane 35 and the heat-expansible element 36 are shown to advantage in FIG. 5.

The third of the supports, 13, includes a mounting portion 41 and an upstanding portion 42 integral therewith. The mounting portion 41 is mounted on the base 10 adjacent the rivet 43 and is in fact secured to the base 10 by the rivet 43. The mounting portion 41 is electrically isolated from the rivet 43, and is also electrically isolated from the end 33 of the mounting flange 30 of the second support 12. The rivet 43 has one end of the winding 17 electrically connected thereto, as indicated at 44, thereby connecting the winding 17 to the terminal B.

The upstanding portion 42 of the support 13 has an arm 45 extending integrally therefrom, to which arm 45 is electrically connected the other end of the winding 17, as indicated at 46. The upstanding portion 42 carries a second fixed electrical contact 47 in juxtaposition to the vane 35, and is electrically connected to this contact 47. The vane 35 is normally biassed away from the contact 47 by the heat-expansible element 36. However, when the heat-expansible element 36 is heated by passing an electric current therethrough in use, it releases the vane so as to engage the contact 47. A conductive strip 48 is mounted on the upstanding portion 42 and is electrically connected thereto. The strip 48 extends above the vane 35, and has connected thereto one end of the heating coil 38, the other end of the heating coil 38 being connected to the ribbon 37. It will thus be manifest that the heating coil 38 is connected in parallel with the vane 35 and the contact 47.

Figure 6:
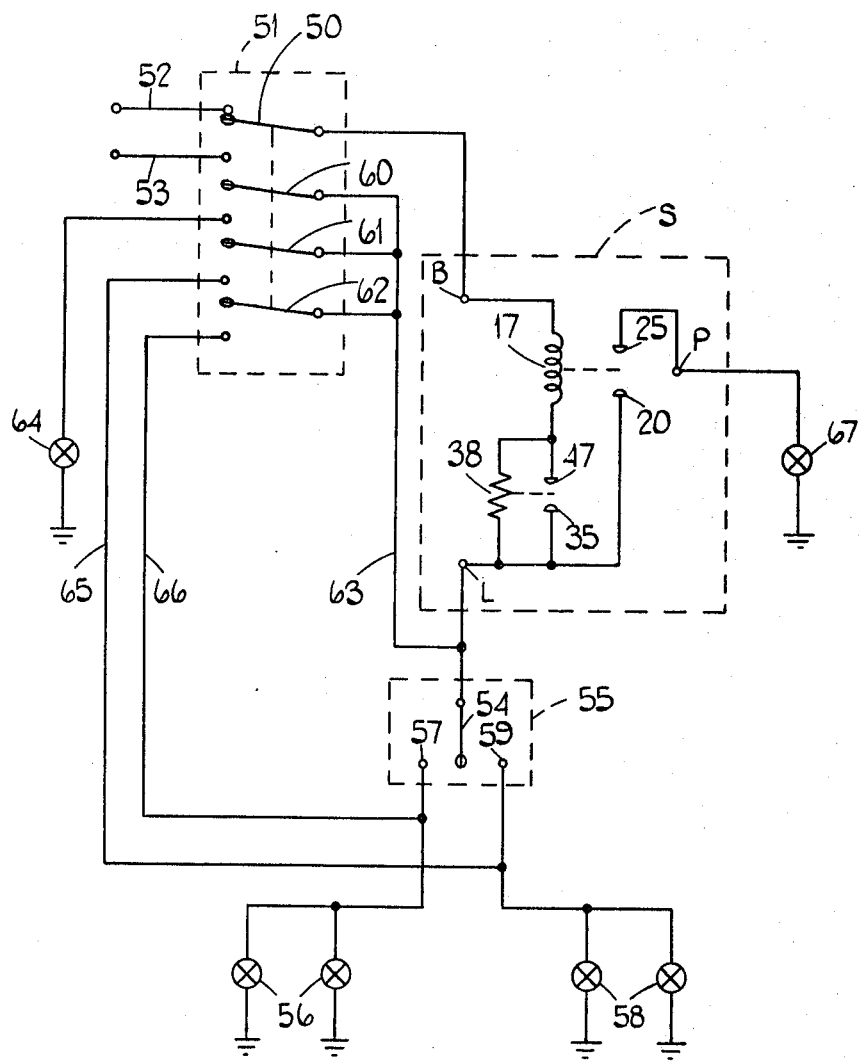
FIG. 6 is a circuit diagram illustrating a manner in which the switch assembly of the present invention is used.

Referring now to FIG. 6, the switch assembly, designated generally as S in this Figure, forms part of a vehicle direction indicator and hazard warning lamp circuit. The first terminal B of the switch assembly S is connected to a movable contact 50 of a switch unit 51, which contact 50 is connectible alternatively to a power supply line 52 from an ignition circuit of the vehicle (not shown) or to a power supply line 53 from a battery of the vehicle (also not shown).

The second terminal L of the switch assembly S is connected to a movable contact 54 of a further switch unit 55. The contact 54 is selectively movable from a neutral position (as illustrated in the Figure) to a position connecting terminal L to a left-hand pair of direction indicator lamps 56 via a switch contact 57 or to a position connecting terminal L to a right-hand pair of direction indicator lamps 58 via a switch contact 59.

The terminal L of switch assembly S is also connected to three further movable contacts 60, 61, 62 of the switch unit 51 via a line 63. The first of these movable contacts, 60, is connectible to a hazard warning indicator lamp 64 and thence to earth. The second of the movable contacts, 61, is connectible to the switch contact 59 via a line 65, and the third of the movable contacts, 62, is connectible to the switch contact 57 via a line 66. The movable contacts 60, 61 and 62 are ganged with the movable contact 50, such that they make their respective connections when the movable contact 50 is connected to the power supply line 53.

The third terminal P of the switch assembly S is connected to a pilot or indicator lamp 67 and thence to earth.

The circuit operates as follows. When it is desired to operate intermittently either the left-hand direction indicator lamps 56 or the right-hand direction indicator lamps 58, the movable contact 54 of switch unit 55 is connected to the appropriate contact 57 or 59, the movable contact 50 of switch unit 51 being connected to line 52. A circuit is thereby completed between the power supply line 52 and the lamps 56 or 58 through the winding 17 and heating coil 38 of the switch assembly S. More explicitly, the circuit is completed through the switch assembly S via the first terminal B, rivet 43, winding 17, arm 45 and upright portion 42 of the third support 13, conductive strip 48, heater coil 38 metallic ribbon 37, vane 35, the second support 12 and thence to rivet 34 and the second terminal L.

Due to the high resistance of the heating coil 38, the current flowing through winding 17 is insufficient to cause the armature 20 to be attracted to the projections 18 and 19 on the first support 11 and to light the direction indicator lamps 56 or 58. The heating coil 38 heats up the ribbon 37 and causes the latter to expand, thereby allowing the vane 35 to snap into engagement with the contact 47. The heating coil 38 is now short-circuited, enabling sufficient current to flow through the winding 17 to attract the armature 20 and to energise the lamps 56 or 58. The armature 20 now engages the contact 25, thereby completing a circuit between the power supply line 52 and the pilot lamp 67 and lighting the latter. More particularly, the circuit is completed through the switch assembly S via the first terminal B, rivet 43, winding 17, arm 45 and upstanding portion 42 of the third support 13, contact 47, vane 35, the second support 12, the first support 11, spring portion 22 and arm portion 21 of the armature 20, contact 25, contact element 26 and thence to the rivet 27 and the third terminal P.

Subsequent to its being short-circuited, the heating coil 38 cools, thereby contracting the ribbon 37 and causing the vane 35 to snap out of engagement with the contact 47. The heating coil 38 is thus brought back into the circuit with a corresponding reduction in the current flowing through the winding 17 and to the direction indicator lamps 56 or 58. This reduction in current causes the armature 20 to move out of engagement with contact 25, since it is no longer attracted by the projections 18 and 19 on the first support 11, thereby breaking the circuit to the pilot lamp 67 and extinguishing the latter. The circuit has now returned to its initial state, with the direction indicator lamps 56 or 58 extinguished. This process is then repeated until the movable contact 54 of switch unit 55 is moved back to its neutral position.

When it is desired to operate the circuit in a hazard warning mode, the movable contact 50 of switch unit 51 is connected to the power supply line 53. This causes the movable contacts 60, 61 and 62 to connect the second terminal L of switch assembly S to the hazard warning indicator lamp 64 and to the direction indicator lamps 58 and 56, respectively. The circuit then operates in exactly the same manner as before, except that all four direction indicator lamps 56 and 58, the hazard warning lamp 64 and the pilot lamp 67 are operated together and intermittently. It will be manifest that, because the heater coil 38 is shorted out of the circuit when the indicator lamps 56, 58 are energised, the switch assembly S is load-independent. That is to say, the flashing rate of the indicator lamps 56, 58 will be substantially constant regardless of whether the circuit is used in its direction indicator mode or its hazard warning mode.

The above-described intermittently-operable electrical switch assembly can be manufactured cheaply and relatively easily. The disposition of the winding 17 with its axis parallel to the general plane of the base 10 ensures that both ends of the winding are located near the upper surface of the base 10. In previous arrangements, the electrical winding has been disposed with its axis perpendicular to the general plane of the base, leaving an end of the winding spaced from the upper surface of the base. Since the points to which the ends of the winding 17 are to be connected are generally disposed close to the upper surface of the base 10, in the switch assembly of the present invention less wire need be used in connecting the ends of the winding 17 to these points.

After initial manufacture, adjustment of the vane 35 relative to the fixed contact 47 and of the armature 20 relative to the fixed contact 25 is usually necessary to ensure proper operation of the switch assembly. Such adjustment is effected by bending the supports on which the vane 35 and armature 20 are respectively mounted. Since, in the switch assembly of the present invention, the vane 35 is mounted on a separate support to that on which the armature 20 is mounted, adjustment of one of these supports does not affect the adjustment of the other of the supports. Adjustment can also be effected by bending the corners of the vane 35 to which the ribbon 37 is secured, and by bending the projection 18 on the first support 11.

The electrical winding 17, when energised, inevitably generates a certain amount of heat. If the heat thus generated is transmitted to the vane 35, the operation of the snap-action circuit breaker may be adversely affected thereby. The amount of heat thus generated can be reduced to a certain extent by using a reduced number of turns in the winding 17, i.e. to reduce its resistance. However, the winding 17 must contain a sufficient number of turns to ensure proper attraction of the armature 20 when energised. In the switch assembly of the present invention, the winding 17 is mounted on a separate support to that on which the vane 35 is mounted. Moreover, the spacing between the winding 17 and the vane 35 can be made relatively large, thereby substantially reducing the effects on the vane 35 of the heat generated by the winding 17.

It will be manifest that, in the switch assembly described above, all the components thereof are secured to the base 10 by means of only three rivets. In previous arrangements, it has been necessary to use more than this number of rivets to secure the components of the switch assembly to the base.

It is to be appreciated that, when the circuit is used in its direction indicator mode and one of the indicator lamps 56 or 58 fails, the current flowing through the winding 17 will be insufficient to cause the armature 20 to be attracted, even when heating coil 38 is short-circuited. Thus, the pilot lamp 67 will not be energised, giving a visual indication that one of the lamps 56 or 58 has failed.

I claim:

1. An intermittently-operable electrical switch assembly comprising an electrically insulating base having a pair of opposed surfaces; first, second and third electrical terminals mounted on said base in spaced relation and extending from one of said opposed surfaces thereof, said first, second and third electrical terminals being for respective connection to an electrical power supply, an electrical apparatus to be operated intermittently by said switch assembly, and at least one indicator lamp; an electrically conducting fixing element securing each of said first, second and third electrical terminals to said base, each said fixing element being electrically connected with its respective electrical terminal and extending through said base to the other of said opposed surfaces thereof;

a first support mounted on the said other surface of said base, said first support terminating at one end adjacent the fixing element for said second electrical terminal and at its other end adjacent the fixing element for said third electrical terminal; an electrical winding on said first support, said first support providing a core therefor, said electrical winding being disposed with its axis substantially parallel to said base; an armature mounted on said first support at the said one end thereof and extending substantially parallel to said electrical winding axis; a first fixed electrical contact mounted on the said other surface of said base adjacent the said other end of the first support, said first fixed electrical contact being electrically connected to the fixing element for the third electrical terminal and being engageable by said armature, said armature normally being biassed away from said first fixed electrical contact but being engaged with said first fixed electrical contact when said electrical winding is energised in use;

a second support mounted on the said other surface of said base and including a portion upstanding from said base and a mounting flange integral therewith, said mounting flange extending in a direction transversely of said electrical winding axis and terminating at one end adjacent the fixing element for the second electrical terminal and at its other end adjacent the fixing element for the first electrical terminal, said second support being secured to said base by means of said mounting flange; a snap-action circuit breaker mounted on said upstanding portion of said second support;

a second fixed electrical contact carried by the said other surface of said base and engageable with said circuit breaker; and a heat-expansible element normally biassing said circuit breaker into a first position and being arranged, when heated by an electric current passing therethrough in use, to release said circuit breaker to move into a second position, said circuit breaker engaging said second fixed electrical contact in one of its said first and second positions.

2. A switch assembly as claimed in claim 1, wherein the fixing element for the second electrical terminal also serves to secure the said one end of the first support to the base.

3. A switch assembly as claimed in claim 2, wherein the first support is electrically connected to the fixing element for the second electrical terminal, and said armature is electrically connected to the first support.

4. A switch assembly as claimed in claim 1, wherein the respective fixing elements for the first and second electrical terminals also serve to secure the mounting flange of the second support to the base.

5. A switch assembly as claimed in claim 4, wherein the second support is electrically conductive and is electrically connected to said circuit-breaker, the mounting flange of said second support being electrically connected to one of the respective fixing elements for the first and second electrical terminals and being electrically isolated from the other.

6. A switch assembly as claimed in claim 5, wherein the second support is electrically connected to the fixing element for the second electrical terminal and is electrically isolated from the fixing element for the first electrical terminal.

7. A switch assembly as claimed in claim 1, wherein a third support is mounted on the said other surface of the base and includes a portion upstanding from said base and a mounting portion integral therewith, said second fixed electrical contact being carried by said upstanding portion, said mounting portion being mounted on said base adjacent the fixing element for the first electrical terminal.

8. A switch assembly as claimed in claim 7, wherein the fixing element for the first electrical terminal also serves to secure the mounting portion of said third support to the base.

9. A switch assembly as claimed in claim 8, wherein the third support is electrically conductive and electrically connected to said second fixed electrical contact, and the mounting portion of the third support is electrically isolated from the fixing element for the first electrical terminal.

10. A switch assembly as claimed in claim 1, wherein the first fixed electrical contact forms part of an electrically conductive contact element which is secured to said base by the fixing element for the third electrical terminal and which is electrically connected with that fixing element.

11. A switch assembly as claimed in claim 1, wherein the snap-action circuit breaker preferably comprises a vane which is disposed substantially parallel to the plane of said base.

12. A switch assembly as claimed in claim 11, wherein the snap action circuit breaker also comprises a metallic ribbon and a heating coil mounted on said ribbon, said ribbon having its ends connected to said vane and having a constriction therein at which said heating coil is mounted.

* * * * *